United States Patent
Cushing (10) Patent No.: US 8,533,100 B2
(45) Date of Patent: Sep. 10, 2013

(54) AUTOMATED BATCH AUCTIONS IN CONJUNCTION WITH CONTINUOUS FINANCIAL MARKETS

(75) Inventor: David Cushing, Lexington, MA (US)

(73) Assignee: ITG Software Solutions, Inc., Culver City, CA (US)

( * ) Notice: Subject to any disclaimer, the term of this patent is extended or adjusted under 35 U.S.C. 154(b) by 120 days.

(21) Appl. No.: 12/627,749

(22) Filed: Nov. 30, 2009

(65) Prior Publication Data

US 2010/0076887 A1   Mar. 25, 2010

Related U.S. Application Data

(60) Division of application No. 12/236,651, filed on Sep. 24, 2008, now abandoned, which is a continuation of application No. 09/480,991, filed on Jan. 11, 2000, now Pat. No. 7,430,533.

(51) Int. Cl.
G06Q 40/00 (2012.01)

(52) U.S. Cl.
USPC .............................................. 705/37; 705/35

(58) Field of Classification Search
USPC ..................................................... 705/35, 37
See application file for complete search history.

(56) References Cited

U.S. PATENT DOCUMENTS

| | | |
|---|---|---|
| 4,949,248 A | 8/1990 | Caro |
| 5,101,353 A | 3/1992 | Lupien et al. |
| 5,689,652 A | 11/1997 | Lupien et al. |
| 5,727,165 A | 3/1998 | Ordish et al. |
| 5,845,266 A | 12/1998 | Lupien et al. |
| 5,873,071 A | 2/1999 | Ferstenberg et al. |
| 5,950,176 A | 9/1999 | Keiser et al. |
| 5,950,177 A | 9/1999 | Lupien et al. |
| 5,963,923 A | 10/1999 | Garber |
| 6,016,483 A | 1/2000 | Rickard et al. |
| 6,098,051 A | 8/2000 | Lupien et al. |
| 6,112,188 A | 8/2000 | Hartnett |
| 6,405,180 B2 | 6/2002 | Tilfors et al. |

(Continued)

OTHER PUBLICATIONS

"Competitivity in Auction Markets: An Experimental and Theoretical Investigation," by Daniel Friedman; Joseph Ostroy. The Economic Journal, vol. 105, No. 428. (Jan. 1995), pp. 22-53.

(Continued)

*Primary Examiner* — Jagdish Patel
*Assistant Examiner* — Sara C Hamilton
(74) *Attorney, Agent, or Firm* — Rothwell, Figg, Ernst & Manbeck P.C.

(57) ABSTRACT

A method and system for performing a batch auction whereby a series of orders, according to a variety of predetermined order types, are generated by qualified market participants and communicated to an auction system. The auction system takes into account each order and its impact upon relative supply and demand to determine by a preset algorithm a price and share transaction quantity. Trades are executed at the price, and a portion of the transaction quantity is allocated to each investor on a fair basis dependent upon their initial orders. In embodiments of the present invention, the auction system uses a computer system or network designed to automatically perform one or more steps of the above method. Such a system is preferably connected to one or more ECNs such that non-executed shares can be automatically sent to outside sources for execution. In alternative embodiments, the invention includes the use of a one or more intermediaries or market makers to cover certain unexecuted trades at the determined price. The present invention is preferably used to conduct batch auctions at the opening and closing of securities trading markets.

14 Claims, 5 Drawing Sheets

(56) References Cited

U.S. PATENT DOCUMENTS

| | | |
|---|---|---|
| 6,421,653 B1 | 7/2002 | May |
| 6,493,682 B1 | 12/2002 | Horrigan et al. |
| 6,560,580 B1 | 5/2003 | Fraser et al. |
| 6,594,643 B1 | 7/2003 | Freeny, Jr. |
| 6,601,044 B1 | 7/2003 | Wallmann |
| 6,618,707 B1 | 9/2003 | Gary |
| 6,691,094 B1 | 2/2004 | Herschkorn |
| 6,718,312 B1 | 4/2004 | McAfee et al. |
| 6,850,907 B2 | 2/2005 | Lutnick et al. |
| 6,968,318 B1 | 11/2005 | Ferstenberg et al. |
| 6,996,539 B1 | 2/2006 | Wallmann |
| 7,099,839 B2 | 8/2006 | Madoff et al. |
| 2002/0019795 A1 | 2/2002 | Madoff et al. |
| 2002/0082967 A1 | 6/2002 | Kaminsky et al. |
| 2002/0169703 A1 | 11/2002 | Lutnick et al. |
| 2003/0093343 A1 | 5/2003 | Huttenlocher et al. |

OTHER PUBLICATIONS

"Privileged Traders and Asset Market Efficiency: A laboratory Study," by Daniel Friedman. The Journal of Financial and Quantitative Analysis, vol. 28, No. 4 (Dec. 1993), pp. 515-534.

"Price Discovery and learning during the Preopening Period in the Paris Bourse," by Bruno Biais, Pierre Hillion, and Chester Spatt. The Journal of Political Economy; Dec. 1999. vol. 107, No. 6. ABI/INFORM Global.

"Service to Match Buyers, Sellers of Stock Blocks—System by Jeffries Group Guarantees Anonymity for Money Managers, " by Lynn Cowan. Wall Street Journal. (Eastern Edition). New York, NY: May 12, 1999. (via Proquest).

AUTOMATED BATCH AUCTIONS IN CONJUNCTION WITH CONTINUOUS FINANCIAL MARKETS

CROSS-REFERENCE TO RELATED APPLICATIONS

This application claims priority to and is a divisional application of application Ser. No. 12/236,651, filed Sep. 24, 2008, which claims priority to and is a continuation of application Ser. No. 09/480,991, which was filed Jan. 11, 2000, the entire contents of each of which are hereby incorporated by reference.

BACKGROUND OF THE INVENTION

1. Field of the Invention

This invention relates generally to securities markets. Particularly, the invention relates to a system and method for batch auctions which are designed to occur at preset times. This can facilitate securities trading particularly either preceding or following periods of trade stoppage or inactivity.

2. Description of the Related Art

A securities trading mechanism can be thought of as a set of protocols that translate the investors' latent demands into realized prices and quantities. The trading mechanism employed at market opening represents the first opportunity to trade after the overnight or weekend non-trading period. Market openings are often characterized by uncertainty over fundamentals, such as share volume and price, and the presence of multiple potential trading parties. For this reason, opening protocols play an especially important role in facilitating "price discovery," or the price which will maximize the number of trades at the resumption of trading in securities markets.

The closing or halting of trading on securities markets also is important because closing stock prices are widely used as benchmarks of the securities' values. Portfolio returns and mutual fund net asset values are computed using closing prices. Additionally, after-hours trading on various alternative trading systems ("ATS") and electronic communications networks ("ECNs") are based on prices of stocks at closing. Thus, large trading volumes often occur near the end of the trading day which has led to concerns regarding price stability and the ability of the markets to provide adequate liquidity.

Thus, it is desirable to have a method or system for facilitating price discovery and providing liquidity in securities markets at the opening and closing of trading as well as during the course of trading throughout the day.

Securities markets have recognized a need to use special protocols to open trading at the start of the day or following periods of non-trading, or to close trading at the end of the day. Opening protocols employed in some securities markets play an especially important role in facilitating price discovery following the enforced trading halt induced by the overnight or weekend non-trading period. Thus, various attempts have been made by markets to introduce special opening procedures designed to provide traders with information regarding market clearing prices with a view towards enhancing liquidity and reducing intra-day price volatility.

The protocols employed vary greatly in significant ways. By way of example, some markets, such as the New York Stock Exchange ("NYSE") are intermediated and rely on designated dealers, market makers and specialists, to select opening prices. Other markets simply rely on accumulated overnight public limit orders to calculate mathematically an equilibrium price at which to open trading. Markets also vary widely with respect to the amount of transparency they provide to investors. For example, in the Paris Bourse, traders obtain a sequence of indicated prices prior to the opening which reflects the current market clearing prices, and are allowed to revise their orders based upon this information. In other markets, only limited pre-open price and volume information can be observed at the time orders are submitted.

Most securities markets, with the notable exception of Nasdaq, therefore use special protocols such as single-price batch auctions to open and close their markets. Similarly, single-price auctions are often used as the blueprint for new, automated trading systems such as that disclosed by U.S. Pat. No. 5,873,071 to Ferstenberg et al. and the system in use by the Arizona Stock Exchange ("AZX"). The prior art approaches employed during market openings and closings, and the protocols followed during batch auctions in general vary significantly.

Figure 1:
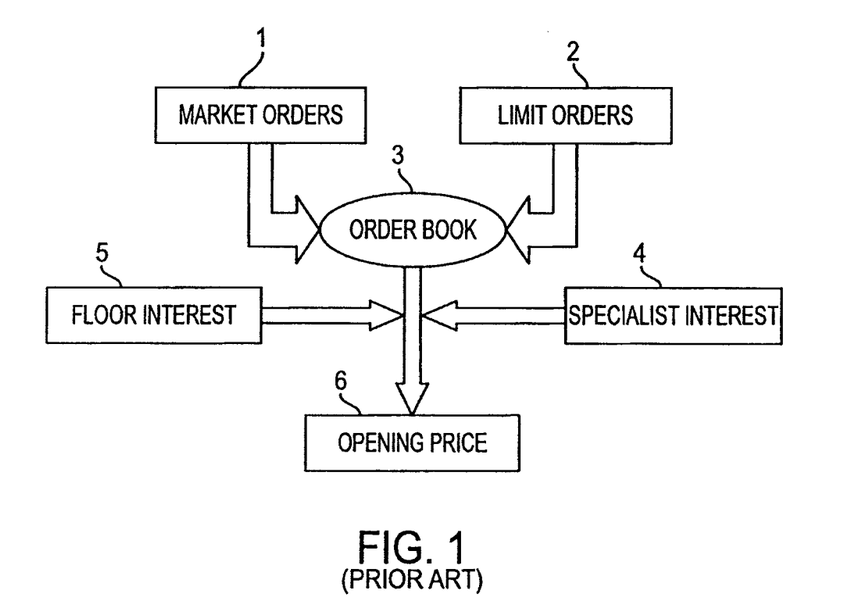
FIG. 1 is a schematic diagram of the interaction between an intermediary and several types of market participants according to a prior art mechanism.

On the NYSE, special protocols apply to the market opening each morning and following periods of suspended trading. As depicted in FIG. 1, the NYSE conducts an "intermediated open" whereby market orders 1 and limit orders 2 accumulate in the limit order book 3 overnight and are reviewed by an intermediary, the specialist, prior to opening. The specialist then uses his or her knowledge regarding the order book and market conditions to set or stabilize security opening price 6 by offsetting large trade imbalances (by personally buying or selling or allowing other floor traders to buy or sell the security as necessary). This system has the inherent drawback in that the specialist has goals which work against accurate price discovery: to provide price continuity, and to maintain a desired inventory of the security. Thus, the price at opening often does not accurately reflect the price dictated by market supply and demand.

The Nasdaq, conversely, currently employs no differentiated opening protocol. During a period prior to the opening of continuous trading on the Nasdaq, market makers and ECNs can enter non-binding price quotes which are broadcast to market subscribers. Although these quotes can be modified at any time prior to the open, they are made to provide a mechanism for dealers to share information and coordinate their pricing decisions. These quotes, however, are at no point binding such that the market makers are under no obligation to execute trades at the quoted price. There are a number of related drawbacks to such a non-differentiated opening. First, there is significant price volatility as accumulated overnight orders are executed in an uncoordinated burst in the first few minutes after the start of trading. This volatility in turn provides an increased potential for price manipulation.

The Paris Bourse and Toronto Stock Exchange ("TSE") operate as continuous limit order markets. The TSE, unlike Paris, employs a designated intermediary, termed the Registered Trader, for each stock who is responsible for maintaining the limit order book. The TSE is transparent as it displays the order book and disseminates an indicated price, the calculated opening price ("COP"), based upon current system orders. The COP is continuously updated based upon new orders and fluctuations in relative supply and demand. To discourage gaming by traders the TSE has implemented anti-scooping rules whereby non-client orders entered within the final two minutes before opening are figured into the COP, and thus guaranteed a fill at the COP, only if they impact the COP. Non-client orders not impacting the COP are not guaranteed a fill at the COP, and are automatically treated by the TSE as the equivalent of a limit order having a price equal to the COP. In the event that there is a "guaranteed fill imbalance" (not all guaranteed orders can be filled by matching orders due to order imbalance), the Registered Trader is required to either provide the requisite liquidity at the COP, or to delay the opening until sufficient orders offsetting the imbalance enters the TSE. Additionally, orders having a price equal to the COP (such as a market order) are allocated executed shares only after all market orders and orders having prices better than the COP are filled. Thus, the priority and allocation rules of the TSE system gives it the inherent drawback in that limit orders at a price equal to the COP can get frozen out of the trading process and are not treated the same as market orders and better priced limit orders. Furthermore, if there are no intersecting limit orders for a particular security, no COP is calculated and no limit orders are executed.

In the Paris Bourse, a similar batch auction system is employed except that traders can observe the limit order book away from the current price. This high degree of transparency allows traders to assess the likely impact on the opening price of new orders, but similarly encourages gaming as orders may be readily canceled up to the open. Furthermore, there is no designated intermediary to provide liquidity when there is an order imbalance. The Paris Bourse also has introduced a closing call auction using similar priority, cancellation, and transparency parameters. This system suffers from several drawbacks, including: significant gaming incentives, price instability, and no guaranteed liquidity.

The Arizona Stock Exchange ("AZX") operates solely in a batch auction market format. Thus, its open (the first trade of the day) and its close (the last trade) do not have protocols which differ from other trades during the day. Like the Paris Bourse, the AZX has a high degree of transparency in that traders are permitted to see the entire order book prior to an auction and can view beforehand the exact price at which trades would occur. This again leads to gaming which prevents accurate price formation.

The OptiMark electronic trading system employed by the Pacific Stock Exchange ("PSE") conducts repeated batch auctions over the course of a market day similar in manner to the AZX, but offers less transparency and generates multiple prices such that all trades of a particular stock during a given auction are not made at the same price.

U.S. Pat. No. 5,950,176 to Keiser et al. discloses an electronic securities trading system which uses a computer program to project price movement of securities and set suggested prices for trading in continuous trading markets. This system does not solve the problems attendant in batch auction methods and systems where providing optimal price determination is hampered by gaming and low liquidity.

The prior art approaches to using batch auctions at the open and close of a financial market, as well as repeatedly throughout the market day along with continuous trading, have encountered numerous drawbacks. Open order books combined with lack of restrictions on the message space prior to the open introduce gaming problems, for example as experienced by traders in the Paris Bourse. The existence of multiple order books with different levels of transparency and different execution priority rules, as used by the AZX, produce undesirable disparities in fill rates. An additional drawback is that simple batch auction design is not sufficient to produce accurate pricing in low liquidity, high volatility markets as is present for thinly traded stocks. Further, intermediated exchanges depending upon human intervention, such as by specialists on the NYSE and TSE, introduce exterior forces upon market price determination, such as the specialists' inventory concerns. Additionally, price discrimination among traders within a single auction based upon their order types, as done by the PSE OptiMark system, can cause dissatisfaction among participating traders with the outcome produced by the auction system.

Due to the above mentioned and other drawbacks, there remains a need in the art for improved methods and systems to conduct batch auctions of financial securities in financial markets, particularly both following and preceding periods of trade stoppage or inactivity.

SUMMARY OF THE INVENTION

Therefore, it is an object of the present invention to provide a method and system for performing securities transactions via a batch auction, whereby the system is incentive compatible in the sense that traders do not have the incentives to game or manipulate the order messages they send to the system.

It is also an object of the present invention to provide a method and system for performing batch auctions of securities which is particularly suited to being conducted either directly preceding or directly following a trade stoppage or period of inactivity.

Further, it is an object of the invention to provide a method and system for performing such transactions which is computationally feasible, and therefore lends itself to broad-based electronic implementation.

Additionally, it is an object of the present invention to provide a method and system for performing such transactions which provides accurate pricing information.

Finally, it is an object of the present invention to provide a method and system for conducting batch or call auctions having allocations for participation by a market-making intermediary.

The present invention provides a method and system for gathering orders from qualified market participants, determining (or "discovering") a price and share quantity based on the aggregate supply and demand represented by all orders submitted, executing the resulting quantity, and "fairly" allocating the executed shares back to the submitters of the orders. The method and system can be advantageously used to periodically initiate ("open") and terminate ("close") trading in financial instruments as well as to operate concurrent with "continuous" trading systems, such as the "continuous auction" operated by the NYSE and by electronic trading on Nasdaq and in ECNs. Financial instruments according to the present invention include stocks, bonds, commodities, options, futures contracts, pollution rights and other tangible and intangible goods. A full iteration of the system, comprised sequentially of an order acceptance period, a price discovery period, and an order execution period, is referred to as an "auction cycle". Auction cycles according to the present invention operate at pre-determined times that are known to qualified auction participants, such as (but not limited to) traders.

In general, the markets that have recognized the special nature of trades performed either at market openings or market closings have instituted specialized, or differentiated, protocols for trades occurring at these times. Commonly, these special protocols have come in the form of a call or batch auction. Each iteration of a batch auction (or an "auction cycle") is typified in that a series of investors simultaneously trade, i.e., buy or sell, a stock at a single price.

In determining the protocols and rules for the batch auction mechanism of the present invention, a series of parameters must be taken into consideration. The first is in regard to transparency and informational parity. The rules adopted regarding these parameters reflect the decision as to what extent each trader participating in the auction can have access to information detailing the buy and sell orders of other traders, the "limit order book," and how it impacts on the amount of "gaming" occurring in the market and perceived marked reliability. A second and related parameter is whether orders may be made and then later canceled or modified. The ability to modify or cancel, like the presence of excess transparency and complete informational parity, may lead to increased gaming by traders. Additionally, rules have to be established regarding a third parameter which is priority of trade orders in the event that there is an imbalance in supply or demand. Finally, a fourth parameter reflects the decision as to whether intermediation will be employed (as is done on the NYSE and TSE with specialists), and to what extent such intermediation will require participation by a designated market maker.

One aspect of the invention comprises a method for performing a batch auction whereby a series of orders, according to a variety of predetermined order types, are generated by qualified market participants and communicated to the auction system. The system takes into account each order and its impact upon relative supply and demand. For each security in question, bids and offers are crossed to determine by a preset algorithm a "discovered" price and share transaction quantity. Trades are executed, and a portion of the transaction quantity is allocated to each investor on a fair basis dependent upon their initial orders.

In preferred embodiments of the present invention, the auction method is performed using a computer system or network designed to automatically perform one or more steps of the method. Qualified market participants therefore may submit orders to the auction system electronically whereby the orders are then stored in a computer database until such time as the orders are modified or canceled by the submitting participant or until commencement of the price discovery period. During the price discovery period, orders received during the order acceptance period are crossed according to a present price discovery algorithm being performed by a computer. Using the algorithm, the computer identifies an optimal price and allocation of trades. These trades are then executed at the optimal price and returned to the qualified participant during the subsequent order execution period.

Another embodiment of the present invention comprises an electronic system for conducting batch auctions of securities. Such a system can be comprised of a computer network designed to accept a plurality of orders from a variety of sources. At a predetermined time, all current orders are crossed according to a preset algorithm to determine a share price and quantity for each security being traded. A trade of shares in an amount equal to the quantity is automatically executed by the system, and then fairly allocated to each order source. Such a system is preferably connected to one or more ECNs such that non-executed shares can be automatically sent to outside sources for execution and to ensure compliance with "trade-through" rules.

In alternative embodiments, the invention includes the use of an intermediary or market maker. Such an intermediary would have access to otherwise confidential information of the limit order book in exchange for a guarantee to cover certain unexecuted trades at the discovered price.

The present invention will become more fully understood from the forthcoming detailed description of preferred embodiments read in conjunction with the accompanying drawings. Both the detailed description and the drawings are given by way of illustration only, and are not limitative of the present invention as claimed.

DETAILED DESCRIPTION OF THE INVENTION

A batch auction cycle of the present invention is comprised of three sequential periods: an order acceptance period, a price discovery period, and an order execution period. During the order acceptance period, the system accepts orders from qualified participants. The definition of a qualified participant will vary as is known in the art depending on how the system is implemented, as well as on the types of financial instruments traded and the country in which it is operated. This definition will often depend on whether the system is implemented as a facility of an established market or exchange. In this case, who are deemed qualified participants will likely be defined or limited by the exchange's rules.

Each order submitted essentially represents the bounds, as defined by the order-submitting trader, within which a purchase/sale of a particular security is desired. All orders generally are comprised of a trade "side" (buy or sell), a security identifier (such as the name or symbol of the security), and a quantity. In embodiments of the present invention, a variety of order types can be used by traders to more thoroughly describe the conditions under which they desire to trade.

A first order type is an "unpriced order." The submission of an unpriced order to the system identifies a desire by the submitter to participate in the auction at whatever price is discovered (if any) during the later price discovery period. An unpriced order for a given auction cycle is fully specified by the above three basic elements: a security identifier, an order quantity, and a trade side.

Optionally, a maximum (minimum) acceptable transaction price can be specified in an unpriced buy (sell) order ("I will not sell for less than $100.00 per share"). This price, however, will not influence the price discovery algorithm as it is described below with respect to the price discovery period.

Another order type which can be submitted to the system is the "priced order." Priced orders are fully specified by four elements: security identifier, order quantity, trade side (i.e. buy or sell) and a desired price. This desired price represents an offer by the trader (e.g., "I will sell X shares for $100.00 per share"), and is used during the price discovery period, described in detail below, to determine the price at which the auction will take place. At the user's option, any unexecuted shares (due to a mismatch in buy and sell orders) of a priced order after the order execution period can be automatically forwarded to another ("secondary") destination at the end of the auction cycle. While not all destinations will necessarily be supported, the user will be able to choose among supported destinations. Where practical, support for unique order attributes of a particular secondary destination, such as "reserve quantity," or "pegging", etc., will be provided.

In preferred embodiments of the present invention, the supplied price stated in priced orders may be supplied in terms of the quoted market for the underlying security, such as equal to the bid, offer, or the mid-point of the bid-offer spread. Alternatively, the supplied price can be made dependent upon fluctuations in the known market indicators (futures price movement) and indices (the S&P 500) occurring between the time the order is submitted and the time the auction begins.

A third type of order which may be submitted according to embodiments of the present invention is the "cross order." A cross order is similar to an unpriced order in that it contains quantity and trade side terms, but is distinguished in that two sides (both buy and sell) of a transaction are submitted to the system as a unit to be crossed at the discovered price. Such an order type is essentially a tool to allow large blocks of shares of a particular stock to quickly be traded between two traders at a market determined price (the discovered price). The opposing sides of a cross order cannot be broken up. If no price is discovered by the execution of priced orders within that particular auction cycle, cross orders will have the option of being returned unexecuted, being held over for the next auction cycle, or being crossed at a reference price that will be computed as part of the auction process. A suitable algorithm for determining both a discovered price and a reference price is described in detail below.

As described above, the amount of transparency present during a batch auction cycle for trading securities is of major concern. A balance must be struck regarding the extent of information regarding other traders' orders which should be supplied during the order acceptance period to each trader participating in the particular auction cycle. If each potential trader has full access to information detailing the buy and sell orders of other traders, known as the "limit order book," an incentive is placed upon traders to try and affect discovered price to their liking by altering their order parameters. The extent of such practice, known as gaming, within the auction system can lead to perceived unreliability.

The system of the present invention provides partial transparency during the order acceptance period of the auction cycle. Specifically, two pieces of information are disseminated continuously in the first of two stages comprising the order acceptance period: an "indicated price" and a "net order imbalance." As each new order is received, the indicated price and net order imbalance is recalculated and disseminated to qualified participants. The indicated price is defined as the price at which an auction would occur if it were to take place at that moment, and is calculated according to the price discovery algorithm detailed below. The net order imbalance is the excess supply or demand in the financial instrument being auctioned (i.e. 1500 surplus shares bid). If there are no intersecting orders (i.e., no possible trades), then "N/A" will be disseminated for the net surplus. At a minimum this information will be made available to some or all qualified participants. Preferably, this information will be made available via market data services and other real-time information providers.

At any time during the first stage of the order acceptance period, any qualified participant may cancel or modify any order they have previously placed during that particular auction cycle. However, the ability to modify or cancel orders, especially when combined with transparency, provide incentives for traders to participate in gaming.

To limit this gaming incentive, the present invention employs an order acceptance algorithm. According to this algorithm, qualified participants who have submitted an order will not be allowed to cancel, reduce the quantity of, or make the price less aggressive than previously placed orders within a specified time window (the "order entry cut-off window") prior to the beginning of the price discovery period. (Modified orders seeking to increase quantity or make the price more aggressive are treated like a new order having the attributes of the order as modified.) This window just prior to the beginning of the price discovery period constitutes the second stage of the order acceptance period. New orders will not be accepted automatically during this stage as they were in the first stage. Such second stage orders will be accepted only to the extent that they offset a published net order imbalance. Thus, buy (sell) orders for a given security will only be accepted if there is an excess supply (demand). Furthermore, the size of any such new second stage order may not exceed the then-current size of the net order imbalance. With respect to new second stage priced orders, the order price must be at least as aggressive (greater than or equal to for bids, less than or equal to for offers) as the then-current indicated price in order to be accepted.

Figure 2:
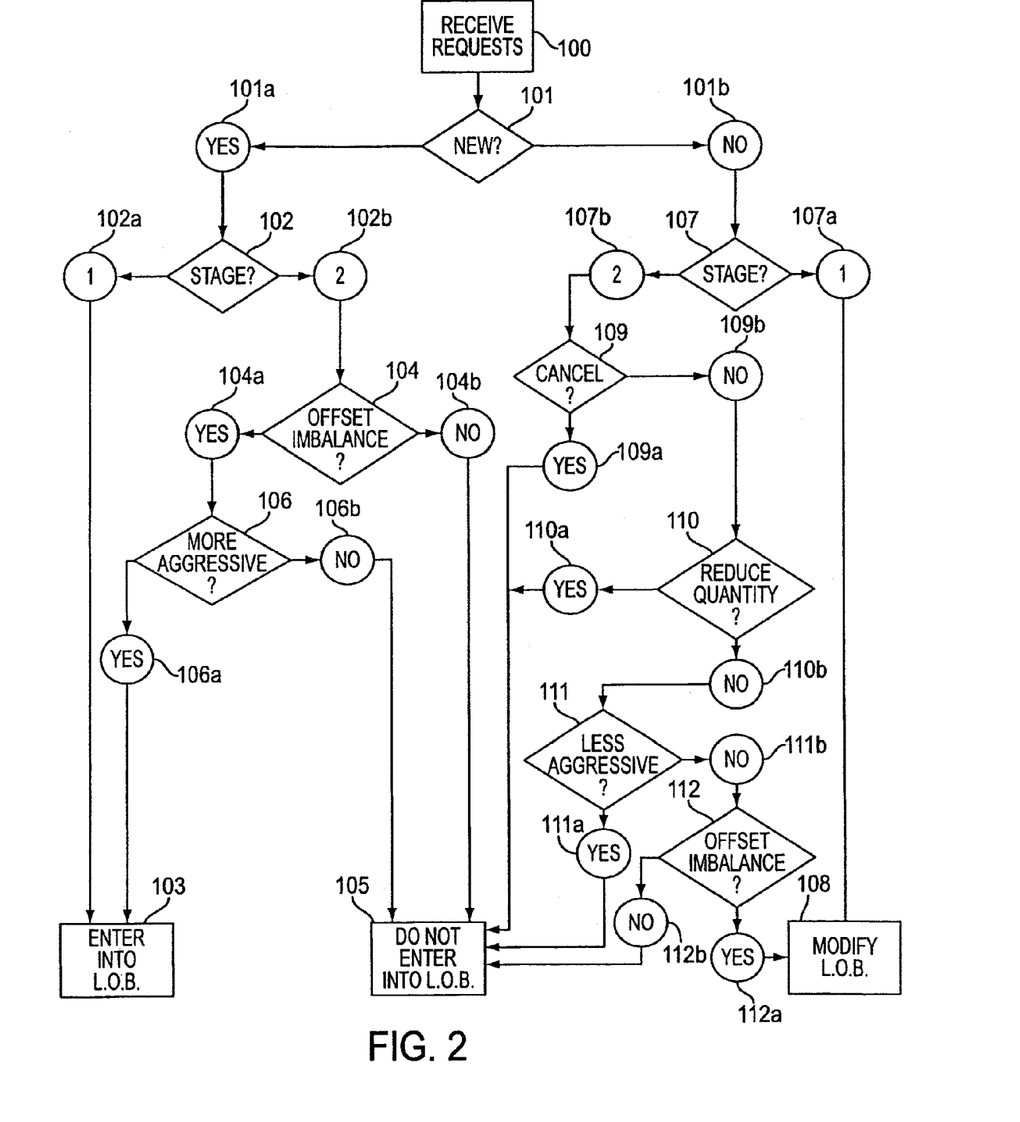
FIG. 2 is a flow chart depicting the algorithm whereby new and modified orders are handled during the order acceptance period in embodiments of the present invention.

Referring to FIG. 2, an exemplary order acceptance algorithm, preferably performed by a computerized system using software, according to one embodiment of the present invention receives an order request 100 and first makes a determination at 101 as to whether the order request constitutes a new order 101a or a modification 101b. The system screens the new order at 102 and makes a determination as to whether it was submitted during the first or second stage of the order receiving period. If the new order was received during the first stage 102a, then this order automatically gets entered into the limit order book 103.

If the new order was received during the second stage 102b, the system then screens the order at 104 and 106 to determine if it would offset a current net order imbalance, and if the price is at least as aggressive as the current indicated price. If the new order satisfies both criteria, then the new order still would be entered into the order book 103 as shown by paths 104a and 106a in the figure. If the new order fails to meet either of these criteria 104 and 106, the order is rejected as late and not entered into the limit order book 105 as shown by paths 104b and 106b.

In the event that the order request received at 100 is found not to be a new order at 101, but instead a modification or cancellation 101b of an order already in the order book, a different set of anti-gaming rules apply. If at 107 the system finds that the modification or cancellation order was received in the first stage 107a of the order receiving period, then the modification or cancellation order would be used to appropriately update the limit order book 108. If at 107 the system finds that the modification or cancellation order request was received in the second stage 107b of the order receiving period, then the system determines whether the request cancels a previous order 109, reduces the quantity of a previous order 110, or makes the price of a previous order less aggressive 111. If the request does any of these three things, then the request is not permitted to update the order book 105 as seen by paths 109a, 110a, and 111a. As shown by paths 109b, 110b, and 111b, requests seeking to modify orders to increase quantity or make the price more aggressive only modify the limit order book 108 if, as with new orders received in the second stage, the request would offset 112a a net order imbalance 112.

After the time window has elapsed and the second stage has ended, no order requests are accepted. The auction itself begins with the commencement of the price discovery period whereby buy and sell orders for each security are crossed at a discovered price. This discovered price is individually calculated for each auction cycle by the price discovery algorithm described in detail below and depicted by FIG. 3, and represents a market optimal price at which to execute submitted orders.

In the event of extreme market conditions, the pre-auction period of auction cycles of the present invention can be extended by successive pre-defined time intervals (e.g. five minutes). This time interval will be applied only to the first stage of order taking, and will in essence push back the window wherein the second stage occurs and push back the time at which the batch auction actually occurs. Preferably, rules will be established for automatic extensions on the basis of order imbalance and movements in certain broad market indexes (as defined and permitted by stock exchange rules and regulations, if any). A human operator in charge of monitoring the system also will have discretionary ability to invoke an extension.

The price discovery algorithm employed during the price discovery period of auction cycles in embodiments of the present invention uses the information contained in priced orders in the limit order book for each auction cycle to calculate, based upon relative supply and demand, a discovered price. This is the price at which all trades of a given security will occur for that particular auction cycle. Preferably, the operation of the price discovery algorithm is automated, such as by software running on a computerized network.

Figure 3:
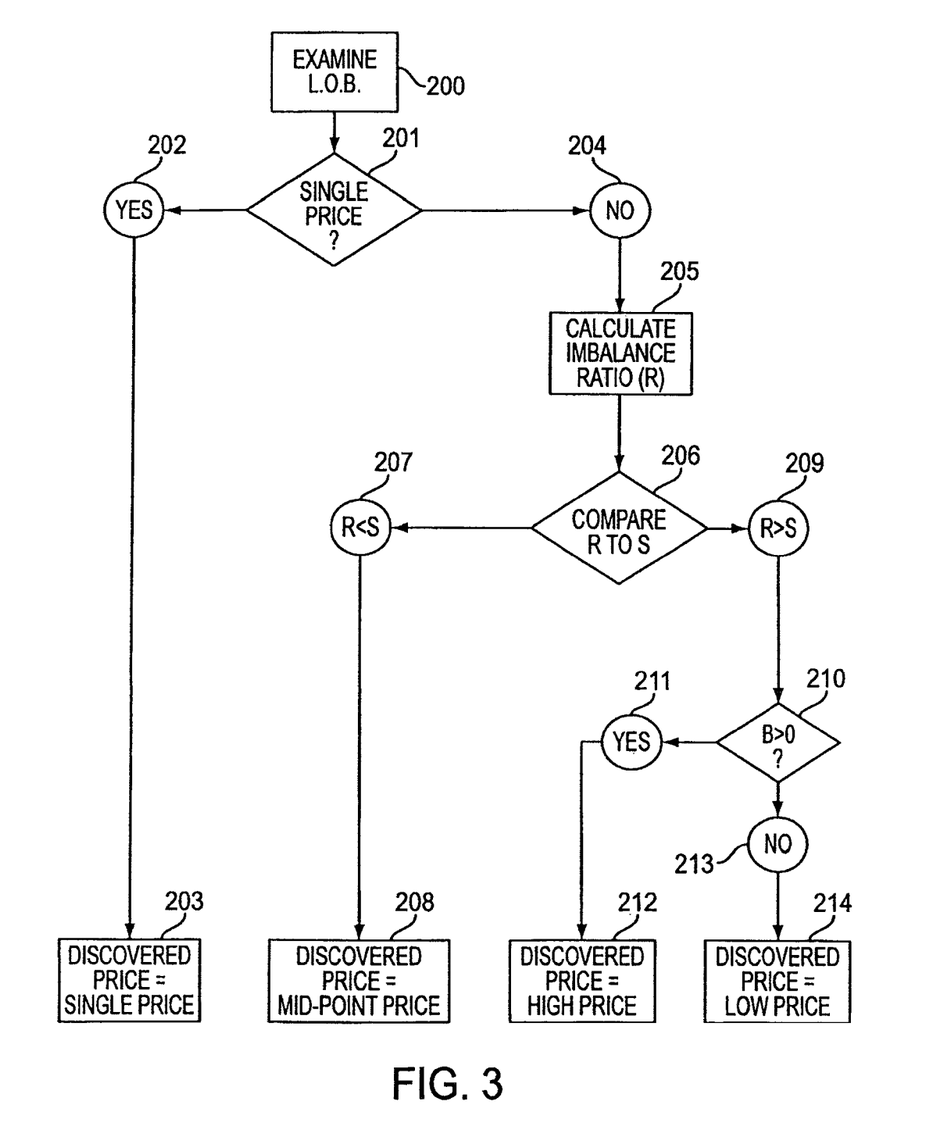
FIG. 3 is a flow chart depicting the algorithm whereby an optimal price is discovered during the price discovery period in embodiments of the present invention.
Figure 4:
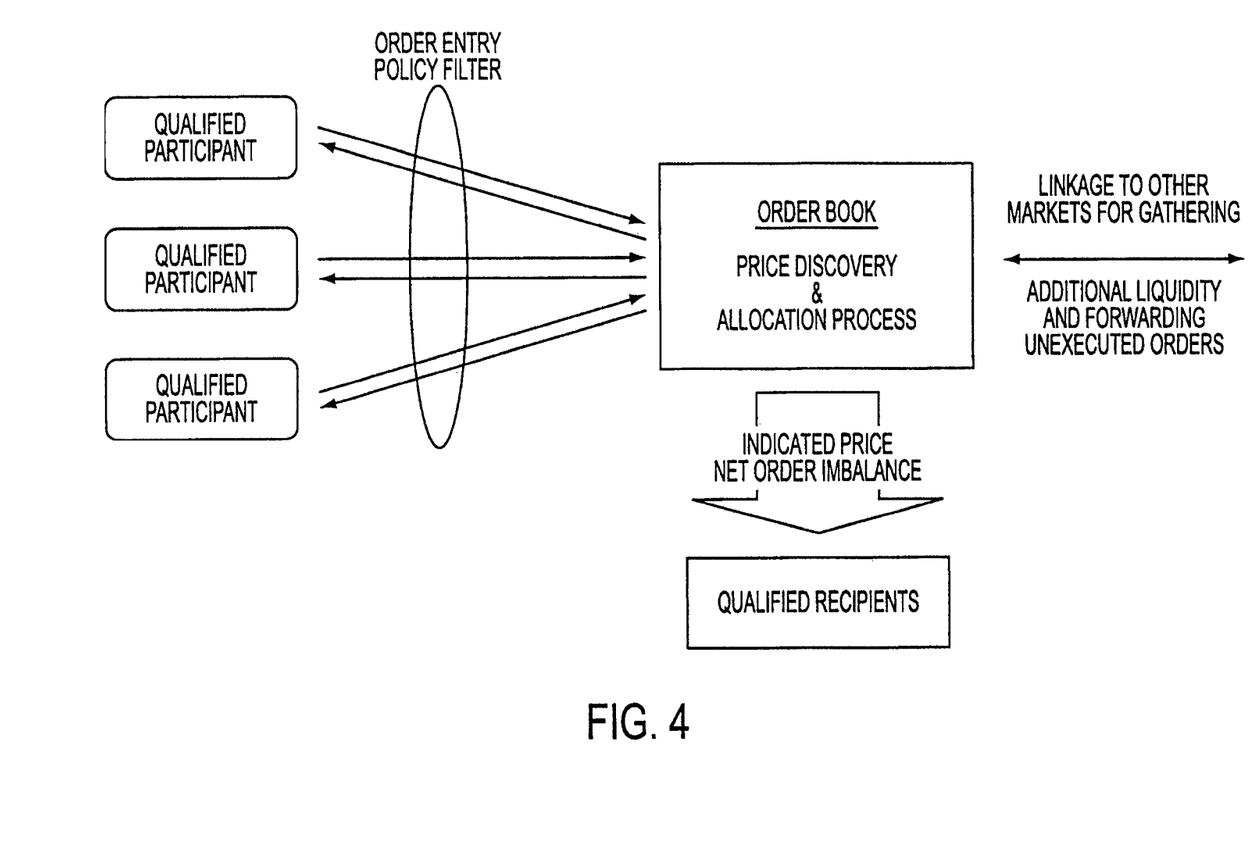
FIG. 4 is a schematic diagram demonstrating the interaction of various factors during operation of a preferred embodiment of the present invention.

As depicted by FIG. 3, a price discovery algorithm according to the present invention first operates by examining the limit order book 200 to identify a price 201 for a given security at which the volume of shares traded will be maximized. In the event that a single security price 202, a "discrete" price, is identified which will cause a maximum amount of shares (from priced orders) to be executed, then that discrete price is identified as the discovered price 203.

EXAMPLE 1

Buyer A enters a priced order offering to buy 10,000 shares for ½.

Buyer B enters a priced order offering to buy 10,000 shares for ⅜.

Seller X enters a priced order offering to sell 10,000 shares for ⅜.

Seller Y enters a priced order offering to sell 10,000 shares for ⅜.

At a price of ½, only A is willing to buy, thus only 10,000 shares would be executed. At a price of ⅜, 20,000 shares would be executed as both A and B are willing to buy 10,000 apiece while X and Y are willing to sell 10,000 apiece. Since there is a single volume maximizing price, the discovered price equals ⅜.

The volume of unpriced orders will be included in the cumulative supply and demand of volume. For example, if there are 50,000 units of unpriced buy orders and 25,000 units of unpriced sell orders, these shares will be added to volume of priced buy and sell orders, respectively, at each price. If unpriced orders meet priced orders that do not intersect, these unpriced orders will cross at the volume-maximizing price with the corresponding priced orders.

In the event that there are only unpriced buy and sell orders, the unpriced orders will trade at a predefined reference price.

EXAMPLE 2

Buyer A enters a priced order offering to buy 10,000 shares at a price of 50.00, and an unpriced order offering to buy 50,000 shares at the determined price.

Buyer B enters a priced order offering to buy 5,000 shares at a price of 50.10.

Seller X enters a priced order offering to sell 20,000 shares at a price of 50.30, and an unpriced order offering to sell 25,000 shares.

Seller Y enters a priced order offering to sell 15,000 shares at a price of 50.20.

Between A, B, X, and Y there are unpriced and non-intersecting priced buy and sell orders on for the particular auction cycle. At a price of 50.00, buyer A would be willing to buy a total of 60,000 shares and buyer B would be willing to buy a total of 5,000 shares. Thus, aggregate demand at a price of 50.00 is 65,000 shares. At this price, neither of seller X's or seller Y's priced orders would be executed. Thus, aggregate supply would equal the total number of unpriced order shares, 25,000.

At a price 50.10, buyer B is willing to buy a total of 5,000 shares, buyer A is willing to buy a total of 50,000 shares (this number being the number of unpriced shares ordered by buyer A). For this price, again neither seller X nor seller Y are willing to buy any priced shares. Therefore, aggregate supply is 25,000 shares.

At a price of 50.20, aggregate demand equals 50,000 shares (this being the number of shares represented by unpriced buys), and aggregate supply is 40,000 shares (this being the number of shares available for sale at a price of 50.20 plus the number of unpriced shares offered).

At the price of 50.30, aggregate demand equals 50,000 and aggregate supply equals 60,000.

Taking the smaller of aggregate demand and aggregate supply at each of the above prices, we will find the total number of shares which will transact at that particular price. Thus, at a price of 50.00, 25,000 shares would be transacted, at 50.10, 25,000 shares would be transacted, at 50.20, 40,000 shares, and at 50.30, 50,000 shares. Therefore, the maximum amount of shares will transact at a share maximizing price of 50.30 wherein 50,000 shares will be executed.

Often, a discrete price cannot be identified. In these circumstances, the price discovery algorithm used in embodiments of the present invention will identify a range of prices 204 that will cause a maximum amount of shares to be executed. Along this range of prices, the amount of shares traded would be constant. In instances where a discrete price cannot be identified, the price discovery algorithm uses the relative amounts of bids (offers to buy) and offers (offers to sell) to determine which price along the range of volume maximizing prices will be discovered.

The price discovery algorithm according to embodiments of the present invention in circumstances where no discrete price is identified first makes a determination 205 as to whether the bid shares are substantially equal to the offered shares. This can be done, for example, by mathematically computing an imbalance ratio ("R") defined as $$R = \left| \frac{B - O}{L} \right| \quad \text{Equation 1}$$

wherein "B" is defined as the number of shares bid to buy at the highest price within the volume maximizing range, "O" is the number of shares offered to sell at the lowest price within the volume maximizing range, and L equals the lesser of O or B. This imbalance ratio is then compared to a predefined standard ("S") for the given security.

Next, the price discovery algorithm compares the imbalance ratio R to the standard S 206. If the imbalance ratio is less than the appropriate standard 207, the discovered price is identified as the mid-point price within the share volume maximizing range of prices 208. This represents a determination that the net order imbalance is not large enough to significantly impact price.

EXAMPLE 3

Same facts as example 1, except that X and Y only wish to sell 5,000 shares apiece for ⅜.

The standard "S" for the particular stock in question is 0.25 (representing a belief that a 25% excess of supply over demand, or vice versa, would constitute a large enough net order imbalance to significantly impact price).

Using equation 1, B is 10,000, O is 10,000, and L is 10,000, thus R is calculated to equal 0.00 (i.e., no net order imbalance). Since R is less than S, the net order imbalance is deemed to not significantly impact price.

Given that X and Y will sell 5,000 shares apiece (10,000 total) whether the price is ½ or ⅜ (there is no single volume maximizing price) and that R is less than S, the discovered price will be the mid-point of the volume maximizing range (⅜ to ½). Thus, the price is ⁷⁄₁₆.

If the imbalance ratio is greater than the appropriate standard 209, the imbalance of supply and demand of the particular stock within the volume maximizing range is considered to have become large enough to impact price. Where the number of bids is found to significantly outnumber the number of offers 210 (B>O), the market price is considered demand driven 211 and results in a discovered price equal to the highest price within the share maximizing range. Conversely, where offers significantly outweigh the number of bids (O>B), the market price is supply driven 213 and results in a discovered price equal to the lowest price within the share maximizing range 214.

EXAMPLE 4

The same facts as in example 3, except that a third buyer, Buyer C, submits a priced order to buy 10,000 shares at ½.

Using equation 1, B is 20,000, O is 10,000, and L is 10,000, thus R is calculated to equal 0.50. Since R is greater than or equal to S (in this instance S=0.25), the net order imbalance is deemed to significantly impact price.

This net order imbalance creates a demand driven price, thus the discovered price is set to the highest price within the volume maximizing range, namely ½.

In alternative embodiments of the present invention, more than one standard may be used. In addition to the standard S which, if exceeded, denotes order imbalances which are large enough to warrant completely tipping the price to either the highest or lowest price within a range, a lower preliminary standard S' can be used to measure when a predetermined partial tipping of price should be employed. Thus, if B>O, and S>R>S', the price would not be demand driven, but only demand pressured. In situations where price is demand or supply pressured, the discovered price would be offset somewhere between the midpoint and the appropriate endpoint of the price maximizing range.

EXAMPLE 5

Buyer D enters a priced order offering to buy 75,000 shares of stock IOU for 50.35.

Seller Z enters a priced order offering to buy 50,000 shares of stock IOU for 49.95.

Stock IOU has a standard, S, set within the auction system equal to 0.60, and a preliminary standard, S', set within the auction system equal to 0.40.

For this example, at any price within the range of 49.95 through 50.35, 50,000 shares of IOU will be exchanged. Using equation 1, the imbalance ratio, R, is calculated to be 0.50, which is less than S, but larger than S'. Thus the price is considered to be demand pressured, but not demand driven. Thus, the determined price will be selected from a price somewhere between the demand driven price, 50.35, and the mid-point of the bid-offer spread, 50.15. A suitable price, for example, could be 50.25, the mid-point of the range of demand pressured price range.

As will be readily apparent to those of ordinary skill in the art, the standard(s) with which to compare the imbalance ratio to can vary from security to security and upon prevailing market conditions. When embodiments of the present invention are performed electronically, the standard can be linked to market indicators (security Beta and volatility, for example) preferably provided continuously by an independent electronic wire service. Further, the value of the standard for a single security can be dependent upon whether there is a demand driven (B>>O) or supply driven (O>>B) imbalance.

For those auctions where no price is discovered, such as in the case where there are no priced orders which intersect which define a share maximizing price, a default price, termed the reference price ("$P_R$"), that is derived from a combination of the orders currently in the order book and continuous market quotes will be computed and disseminated at the end of the auction cycle. This reference price in turn, as described above, will be used to execute cross orders and unpriced orders. Details of the reference price calculation will depend on the specific implementation of the system.

In preferred embodiments of the invention, the reference price calculation algorithm will be performed by software running on one or more computers and will vary depending upon whether the particular auction cycle is being conducted as a closing, an opening, or as a normal periodic auction in conjunction with continuous trading on a continuous trading market.

For a batch auction cycle occurring at the close of trading or during trading, the order acceptance period occurs while the continuous market is open. Thus, an accurate measure of an optimal price, assuming no volume maximizing price is identified by the price determination algorithm employed, may be identified as being the mid-point of the of the most recently published unqualified complete quotation (quotation having a valid bid, bid size, valid offer, and offer size) reported by the continuous market prior to the beginning of the price discovery period.

For a batch auction occurring at the opening of the continuous trading market, the order acceptance period occurs while the continuous trading market is closed. Thus, quotes from trading in the continuous market cannot be used to set the reference price. Thus, in situations where there are only priced offers and no priced bids, and the highest bid is higher than the most recently published unqualified trade price ("MRPUTP"), as obtained from a consolidated tape system or other real time quote service, the reference price is set equal to the highest bid price. Where there are no priced offers, and the lowest offer is lower than the MRPUTP, the reference price is set equal to the lowest offer price. In all other scenarios with opening auction cycles, such as when there are no priced orders within the system, the reference price is defined as the MRPUTP.

After a discovered price is identified by the price discovery algorithm, the price discovery period ends and the final part of the auction cycle, the order execution period, begins. During this final period, the volume maximizing amount of shares which are executed at the discovered price are fairly allocated among "qualifying" orders. Qualifying orders include all unpriced orders as well as priced orders that are at least as aggressive (bid orders having a price greater than or equal to the discovered price, and offer orders having a price less than the discovered price) as the discovered price. During the order execution period, each qualifying order will receive a pro-rata allocation of the available liquidity, i.e, the shares of the given security which will be traded during that particular auction cycle.

EXAMPLE 6

Given the facts according to example 3, the full 10,000 shares sold by X and Y at 7/16 is allocated to A because the discovered price is higher than the price entered by B. Thus, A is the only buyer willing to pay the discovered price.

EXAMPLE 7

Given the facts according to example 4, the 10,000 shares sold by X and Y at ½ is allocated pro-rata to each buyer willing to meet that discovered price. Buyers A and C are both willing to buy up to 10,000 shares apiece at a price of ½, thus the shares are allocated equally between them. Thus, A and C are each allocated 5,000 shares at ½.

After the trades are allocated among qualifying orders, each trader is notified of the results of their order, including whether a trade did or did not occur, whether their order was a qualifying order, the price at which trades occurred (if applicable), and the quantity traded shares allocated to him (if applicable). Optionally, in embodiments of the present invention, other information can be provided to the trader post auction including the net order imbalance and total number of shares executed. When qualifying orders were electronically submitted, trader notification of auction results can be performed electronically as well.

A batch auction system in preferred embodiments of the present invention is connected to one or more ECNs such that non-executed shares can be automatically sent to outside sources for execution. Thus, participants who had submitted priced orders having less aggressive prices than the discovered price, or having a net order imbalance, could attempt to have their desired trades executed outside the batch auction.

Figure 5:
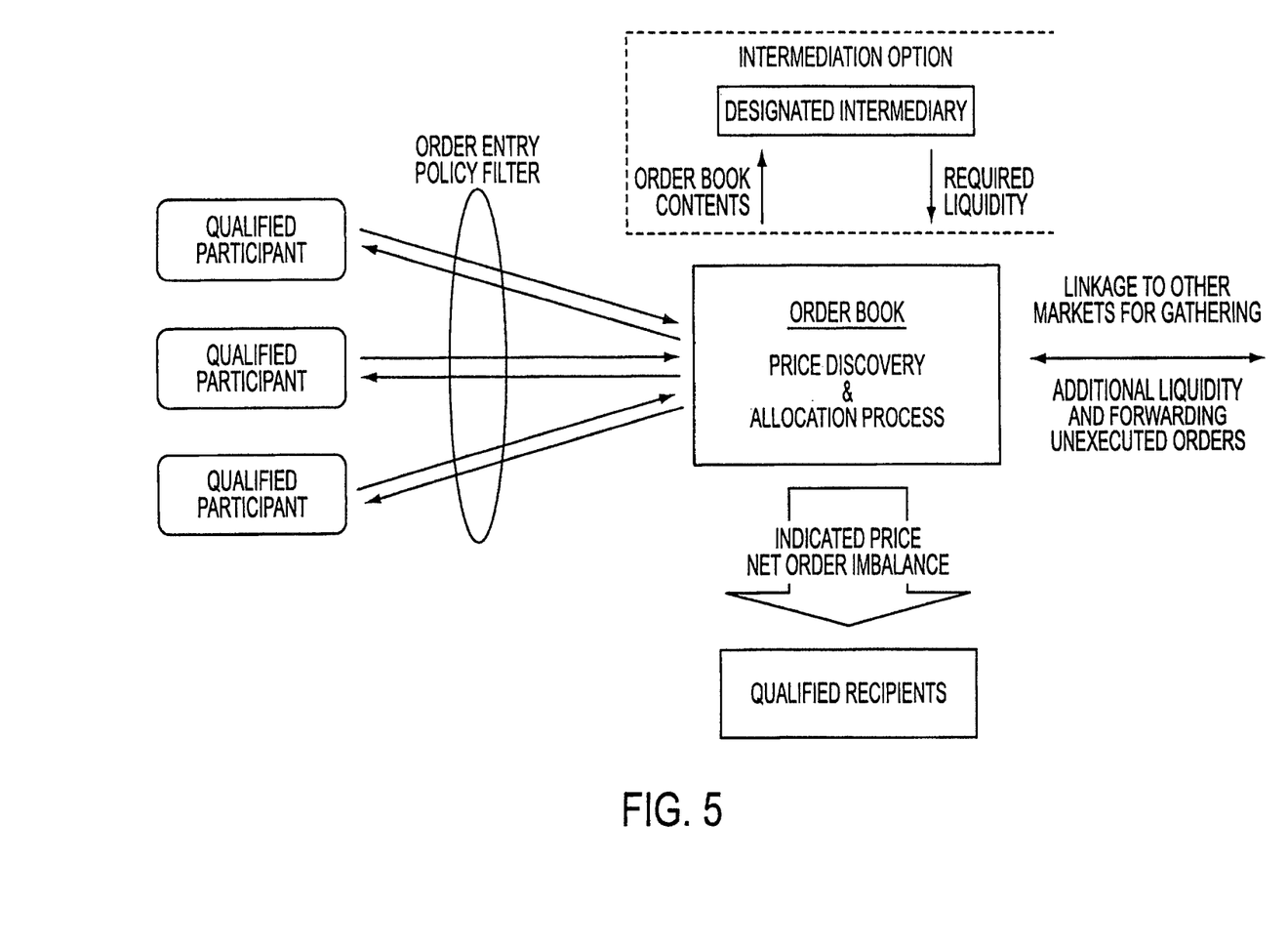
FIG. 5 is a schematic diagram of a preferred embodiment of the present invention wherein an intermediary is employed.

In an alternative embodiment of the present invention as depicted by FIG. 5, one or more designated intermediaries will be responsible for filling all eligible orders that would otherwise be unfilled, at the auction price. Thus, no unmatched orders would be generated. All unpriced orders as well as priced orders that are at least as aggressive as the discovered price will be filled in their entirety. In return for fulfilling this obligation, the intermediaries receive the benefit of viewing the entire limit order book for each security for which they are the designated intermediary during the auction process.

In embodiments of the present invention which employ an intermediary, the designated market maker will have discretion to extend the auction. As with specialists on the NYSE and TSE, the intermediary will be subject to pre-defined market or exchange guidelines and will be subject to sanctions in the event that an inappropriate extension is made.

As will be apparent to one of ordinary skill in the art, the present system can be modified in a variety of manners to provide additional functional features. By way of example, the permissible order types may be modified, or new order types introduced in alternative embodiments of the present invention. Such a new order type could be in the form of a "contingent order" which represents a desire by the trader to "only buy security A if I can sell security B and the price ratio of A:B is less than X." Also by way of example, order types may be modified to allow the specification of portfolio dollar constraints. Such constraints would permit a series of orders for different securities to be linked as a portfolio, and only permit orders in that portfolio to be executed to the extent that maximum levels (in value terms) of net buying and selling are not exceeded.

The invention being thus described, it will be apparent to those skilled in the art that the same may be varied in many ways without departing from the spirit and scope of the invention. Any and all such modifications are intended to be included within the scope of the following claims.

What is claimed is:

1. A method of performing a batch auction of a security, comprising steps of:
    during an order acceptance period, continuously disseminating, by one or more computers, to qualified participants order information including a current indicated price and a current net order imbalance, wherein the current indicated price is the price at which the batch auction would occur if it were to take place at that moment and wherein the current net order imbalance is an excess supply or demand in the security,
    receiving, by said one or more computers during said order acceptance period, a plurality of messages containing orders from one or more qualified participants, and
    accepting, by said one or more computers during said order acceptance period, those orders that include a price that is at least as aggressive as the current indicated price and would offset the current net order imbalance;
    storing, in an order book database located on said one or more computers, each of said accepted orders received;
    calculating, by said one or more computers, an optimal price upon which to transact a maximum number of shares of the security during the batch auction based upon said order book database;
    executing, by said one or more computers, the batch auction of said maximum number of shares of the security at a given execution time;
    allocating, by said one or more computers, said maximum number of shares of the security among said accepted orders according to a predetermined criterion;
    publishing, by the one or more computers, a predetermined selection of data from said order book database; and
    notifying, by said one or more computers, said qualified participants of results of said executed batch auction.

2. The method of performing a batch auction of a security according to claim 1, wherein said order information comprises parameters describing trade side, security identifier, and quantity of shares.

3. The method of performing a batch auction of a security according to claim 1, wherein said orders have order types selected from the group consisting of unpriced orders, priced orders, and cross orders.

4. The method of performing a batch auction of a security according to claim 1, wherein the batch auction is conducted concurrently with a continuous trading financial market.

5. The method of performing a batch auction of a security according to claim 4, wherein the batch auction is performed at the open or close of said continuous trading market.

6. The method of performing a batch auction of a security according to claim 1, wherein said optimal price is calculated based upon a relative supply and a demand dictated by said order book database.

7. The method of performing a batch auction of a security according to claim 6, wherein said calculating step further comprises comparing said relative supply and demand to a standard.

8. The method of performing a batch auction of a security according to claim 1, wherein said canceling of and modifying of orders within the order book is restricted a predetermined time before said price discovering step begins.

9. The method of performing a batch auction of a security according to claim 1, wherein a designated intermediary is permitted to view said order book and to cover orders for unexecuted shares at said optimal price.

10. A computerized system for performing a batch auction of a security, comprising:
   a computerized network having one or more computers in electronic communication with each other;
   the one or more computers configured to:
   during an order acceptance period, continuously disseminate to qualified participants order information including a current indicated price and a current net order imbalance, wherein the current indicated price is the price at which the batch auction would occur if it were to take place at that moment and wherein the current net order imbalance is an excess supply or demand in the security, receive a plurality of messages containing orders from one or more qualified participants, and accept those orders that include a price that is at least as aggressive as the current indicated price and would offset the current net order imbalance;
   an order book database located on said one or more computers, wherein said order book database is configured to store each of said accepted orders received,
   wherein said one or more computers are further configured to calculate an optimal price upon which to transact a maximum number of shares of the security during the batch auction based upon said order book database,
   wherein said one or more computers are further configured to execute the batch auction of said maximum number of shares of the security at a given execution time, and to allocate said maximum number of shares of the security among said accepted orders according to a predetermined criterion; and
   wherein said one or more computers are further configured to publish a predetermined selection of data from said order book database, and to notify said qualified participants of results of said the executed batch auction.

11. The computerized system for performing a batch auction of a security according to claim 10, wherein said predetermined selection of data published by said price notification program comprises an indicated price and net order imbalance.

12. The computerized system for performing a batch auction of a security according to claim 10, wherein said messages can contain order types selected from the group consisting of unpriced orders, priced orders, and cross orders.

13. The computerized system for performing a batch auction of a security according to claim 10, further comprising an electronic connection for forwarding unexecuted orders to outside markets.

14. The computerized system for performing a batch auction of a security according to claim 10, further comprising communication connections whereby said qualified participants may remotely submit said messages to said order receiving program electronically.

* * * * *